Dec. 30, 1924.

S. S. MATTHES

CONDUCTOR SUPPORT

Filed Sept. 30, 1924

Witness:
H. J. Stromberger

Inventor
Samuel S. Matthes
By
Attorney

Patented Dec. 30, 1924.

1,521,200

UNITED STATES PATENT OFFICE.

SAMUEL S. MATTHES, OF MANSFIELD, OHIO, ASSIGNOR TO THE OHIO BRASS COMPANY, OF MANSFIELD, OHIO, A CORPORATION OF NEW JERSEY.

CONDUCTOR SUPPORT.

Application filed September 30, 1924. Serial No. 740,718.

*To all whom it may concern:*

Be it known that I, SAMUEL S. MATTHES, a citizen of the United States of America, residing at Mansfield, in the county of Richland and State of Ohio, have invented certain new and useful Improvements in a Conductor Support, of which the following is a specification.

My invention relates to a support for trolley conductors and to that class of support in which is provided bendable lips which can be formed about the trolley conductor.

The object of my invention is to produce a trolley conductor support of this class in which the passage of the current collector from the trolley wire on to the support, and vice versa, can be accomplished with ease and smoothness so that the trolley conductor will not be thrown from its contact with the trolley wire or support in passing, as this will cause arcing, which is detrimental to the trolley wire, support and the current collector. By having the current collector pass easily and smoothly from the trolley conductor to the support, and vice versa, rebound of the current collector is avoided and therefore, a pounding upon the trolley conductor or the support when the current collector again assumes its normal position is avoided and this avoids injury to the trolley conductor or support.

I accomplish these objects and others disclosed hereinafter through the construction, arrangement and shape or formation of the various parts, especially of the lips, of which my invention is composed, as hereinafter fully described and disclosed in the drawing accompanying this specification.

In the drawing:

Fig. 1 is a top view of my invention.

Fig. 2 is a side view in elevation of my invention.

Fig. 3 is an end view of Fig. 2, but to a larger scale.

Figs. 4, 5, 6 and 7 are sectional views on the corresponding lines of Fig. 2.

Fig. 8 is an enlarged view of a portion of the lower surface of Fig. 2 if the same had placed therein a trolley conductor and the lips were clinched or formed about the conductor.

Figs. 9, 10 and 11 are sectional views on the corresponding lines on Fig. 8 and the dotted circular line represents the outline of a current collector of the trolley wheel type to show the approximate relation of contact.

Fig. 12 is a sectional view on the line 4—4 of Fig. 2, providing the lips of Fig. 2 were clinched about a trolley conductor. This figure in size corresponds with Figs. 9, 10 and 11.

My invention comprises three principal parts, namely; a supporting boss 1 and the depending lips 2 forming a longitudinal member 3. The boss 1 is provided with a flange 4 and an internal thread 5 to engage with the corresponding thread on a hanger or other support.

The lips 2 extend for the full length of the device and form a U shaped groove 6 to receive the trolley conductor 7. The formation of the lips 2 are of great importance as their formation effects materially the manner in which the current collector passes from the trolley conductor on to the ear and from the ear back on to the trolley conductor and, as already pointed out, unless the passage is smoothly accomplished, great damage may be done to the current collector, the support and the trolley conductor, and where traffic is heavy and current consumption fairly large, the damage has been found to be accomplished in a very short time.

In constructing ears of the clincher type, the ends of the ear must be so made as to offer no obstruction to the current collector passing on to the ear from the trolley conductor and when so made, the passage of the current collector from the ear to the trolley conductor at the opposite end will be made smoothly. The longitudinal member 3 should be sufficiently heavy and strong to properly support the trolley conductor, and the lips should be reasonably thick in order to not only give support, but to permit of reasonable wear. With these points in view, I have shaped and formed the lips, as clearly disclosed in the drawing, and it will be observed that between the lines 5—5 on Figs. 1 and 2, that the width A of the longitudinal member 3 is uniform and that from the lines 5—5 to the adjacent ends of the ear, the over-all width B of the longitudinal member varies. The point 5—5 at which the uniformity in width of the longitudinal member begins to vary may be made nearer or farther from the center of the ear than that shown herein, depending upon the results desired, the thickness of the lips between the lines 5—5 and the length of the ear. The lips may, if it is so desired, have their maximum over-all width at the center of the ear, as on the line 4—4, and taper in either direction from this point to the ends of the ear.

It will also be noted in Fig. 2 that the depth C of the groove formed by the lips is uniform between the lines 5—5 and the depth D of the adjacent end of the ear varies. It will be seen from this that that portion of the longitudinal member from the end of the ear to the adjacent line 5—5 varies in height and width, having the least height and width at the end of the ear. This construction will give the sections as shown in Figs. 4, 5, 6 and 7 of the drawing before the lips are clinched on to the conductor 7, and will give the sections shown in Figs. 9, 10 and 11, as the lips are formed about the trolley conductor 7.

By studying these sections, it will be seen that the lips grasp the wire at their extreme ends higher up on the conductor than they do toward the center of the ear, as shown in Figs. 9 and 10. It will also be noted that the lips in Fig. 11 are very much thinner and tapering than in Figs. 9 and 10, and it will also be observed that a current collector of the wheel type, as indicated by the dotted line 8 in Figs. 9, 10 and 11, will engage the conductor gradually as it passes from the trolley conductor toward the center of the ear. This engagement will vary between the end of the ear and the line 5—5 on Figs. 1 and 2, as the relation of the lips to the trolley conductor varies therebetween.

I find that any ear formed as just described, if the manufacturing operation is carried out carefully, requires very little changes on the outside of the lips 2, and I have found that the only work that may be required on the outside of the lips is that of slightly tapering the extreme end of the lips to a knife edge, as indicated at 9.

United with the boss 1 and the lips 2 are the webs 13 which stiffen and strengthen the ear as a whole. I have found that in the past practically all ears have been made with the longitudinal member of uniform external width throughout and the lips of uniform thickness from end to end and producing a groove of uniform depth and occasionally in some cases, the external surface of the lips along their lower edge would be ground from end to end to produce a knife edge throughout their length, but it will be apparent that in such case it was only a matter of reducing the thickness of the metal in the lips at a point where it is mostly needed, that is, along their edge which engages with the current collector, as shown in Figs. 9 and 10, and in such cases considerable expense has been required to place the knife edge on the lips, as described.

Modifications will be apparent to those skilled in the art, therefore, I do not wish to be limited otherwise than by my claims.

1. A conductor support comprising in combination, a support member and a longitudinally disposed member secured to the support member, the longitudinal member comprising oppositely disposed and depending lips forming a groove therebetween to to receive the conductor and to be gripped by the lips when bent over, the lips substantially meeting for a distance each side of the center line when bent around the conductor and the adjacent edge of the lips for said distance being of substantial thickness, the width of the longitudinal member for the above distance in which the lips substantially meet being uniform, the longitudinal member decreasing in width from the point where the lips cease to substantially meet and tapering to a substantially knife edge at the ends of the longitudinal member and the lips also gradually decreasing in height for said distance at each end of the longitudinal member forming a groove of gradually decreasing depth, such that the lips will gradually diverge when bent about the conductor, the lips also gradually decreasing in thickness towards the ends of the longitudinal member and forming a substantially knife edge at the ends to form a smooth and gradual passage of the current collector in passing from the conductor on to the support and vice versa.

2. A conductor support comprising in combination, a supporting member and a longitudinally disposed member secured thereto and provided with oppositely disposed lips forming a groove to receive and hold a conductor when the lips are bent thereabout, the longitudinal member comprising three sections, namely; a central section and two end sections, the lips of the central section arranged to substantially meet when bent about the conductor and being of uniform thickness throughout the length of said section, the lips of the end sections gradually decreasing in height forming a groove of decreasing depth towards the ends of the support, the thickness of the lips and the width of the end sections of the longitudinal member also gradually decreasing in thickness and width respectively to form a substantially knife edge at the extreme ends of the support.

3. A conductor support comprising in combination, a supporting member and a longitudinally disposed member secured thereto and provided with oppositely disposed lips forming a groove to receive and hold a conductor when the lips are bent thereabout, the longitudinal member comprising three sections, namely; a central section and two end sections, the lips of the central section of uniform height and thickness throughout the length of the section and gradually decreasing in thickness and height from the ends of the central section to the ends of the longitudinal member to form a reduced depth of groove and a substantially knife edge of the lips at the extreme ends of the longitudinal sections.

4. A conductor support comprising in combination, a supporting member and a longitudinally disposed member secured thereto and provided with depending lips forming a groove for the purpose described, the longitudinal member comprising three sections, a central section and two end sections, the lips of the central section adapted to substantially meet when bent about a conductor and having substantially uniform thickness for the length of the sections, the lips of the end sections gradually decreasing in thickness from the ends of the central section to the ends of the longitudinal member from the full thickness of the central section to a substantial knife edge at the ends of the longitudinal member.

5. A conductor support comprising in combination, a supporting member and a longitudinal member secured thereto and provided with depending lips forming a groove for the purpose described, the longitudinal member increasing in width gradually from its ends toward the center and the lips increasing in thickness gradually toward the center of the longitudinal member from a substantially knife edge at the ends of the longitudinal member.

6. A conductor support comprising in combination, a supporting member and a longitudinal member secured together and provided with depending lips forming a groove for the purpose described, the longitudinal member tapering and increasing in width from its ends toward the center and the lips gradually increasing in height and thickness toward the center from a substantially knife edge at the ends of the longitudinal member.

7. A conductor support comprising in combination, a supporting member and a longitudinal member provided with depending lips forming a groove for the conductor and adapted to be bent around the conductor to hold the same, the edges of the lips gradually approaching each other and having their greatest opening adjacent the ends of the longitudinal member, the lips also gradually increasing in thickness from the ends of the longitudinal member toward the center and the width of the longitudinal member, also gradually increasing in width from the ends of the longitudinal member toward the center.

8. A support comprising in combination, a supporting member and a longitudinal member secured together and provided with depending lips forming a groove for the purpose described, the longitudinal member having three sections, a central section and two end sections, the width of the central section being uniform and the width of the end section gradually decreasing from the ends of the central section to the ends of the longitudinal member.

In testimony whereof I affix my signature.

SAMUEL S. MATTHES.